US010574484B2

United States Patent
Ma et al.

(10) Patent No.: US 10,574,484 B2
(45) Date of Patent: Feb. 25, 2020

(54) METHOD FOR IMPLEMENTING RESIDENTIAL GATEWAY SERVICE FUNCTION, AND SERVER

(71) Applicant: Huawei Technologies Co., Ltd., Shenzhen, Guangdong (CN)

(72) Inventors: Yun Ma, Beijing (CN); Jian Li, Beijing (CN); Guangyu Sun, Beijing (CN); Xi Yang, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 235 days.

(21) Appl. No.: 15/046,223

(22) Filed: Feb. 17, 2016

(65) Prior Publication Data
US 2016/0164699 A1 Jun. 9, 2016

Related U.S. Application Data

(63) Continuation of application No. PCT/CN2013/081812, filed on Aug. 20, 2013.

(51) Int. Cl.
*H04L 12/66* (2006.01)
*H04L 29/12* (2006.01)
*H04L 29/06* (2006.01)

(52) U.S. Cl.
CPC .......... *H04L 12/66* (2013.01); *H04L 61/2007* (2013.01); *H04L 61/2503* (2013.01); *H04L 63/0236* (2013.01)

(58) Field of Classification Search
CPC ..... H04L 12/6418; H04L 12/66; H04L 61/20; H04L 61/2007; H04L 61/25;
(Continued)

(56) References Cited

U.S. PATENT DOCUMENTS 6,243,379 B1 * 6/2001 Veerina ................... H04L 12/46
370/389
6,876,632 B1 * 4/2005 Takeda ................... H04M 3/428
370/259
(Continued)

FOREIGN PATENT DOCUMENTS

CN 2586306 Y 11/2003
CN 2674775 Y 1/2005
(Continued)

OTHER PUBLICATIONS

Troan et al., Mapping of Address and Port with Encapsulation, Mar. 18, 2013, https://tools.ietf.org/pdf/draft-ietf-softwire-map-05.pdf (Year: 2013).*

(Continued)

*Primary Examiner* — Khang Do
(74) *Attorney, Agent, or Firm* — Womble Bond Dickinson (US) LLP

(57) ABSTRACT

A method for implementing a residential gateway service function, and a server are disclosed. The method may include: receiving, by a server, a data packet forwarded by a residential gateway (RGW) or a network side; identifying, by the server, a service type of the data packet according to information carried in the data packet; and providing, by the server, based on the service type of the data packet, a virtual residential gateway service for a user terminal connected to the RGW.

10 Claims, 6 Drawing Sheets

(58) Field of Classification Search
CPC ............ H04L 61/2503; H04L 61/2507; H04L 61/251; H04L 63/0227; H04L 63/0236
See application file for complete search history.

(56) References Cited

U.S. PATENT DOCUMENTS

| | | | | |
|---|---|---|---|---|
| 8,812,670 | B2* | 8/2014 | Haddad | H04L 12/2834 709/225 |
| 2011/0191223 | A1* | 8/2011 | Singh | G06Q 30/04 705/34 |
| 2013/0010614 | A1* | 1/2013 | Lin | H04L 12/2898 370/250 |
| 2013/0091254 | A1* | 4/2013 | Haddad | H04L 61/6059 709/220 |
| 2013/0091279 | A1* | 4/2013 | Haddad | H04L 12/2834 709/225 |
| 2013/0279518 | A1* | 10/2013 | Sarikaya | H04L 29/06068 370/467 |
| 2014/0201374 | A1* | 7/2014 | Ashwood-Smith | H04L 49/70 709/226 |
| 2014/0373151 | A1* | 12/2014 | Webb | H04L 63/145 726/24 |

FOREIGN PATENT DOCUMENTS

| | | |
|---|---|---|
| CN | 1859292 A | 11/2006 |
| CN | 2891501 Y | 4/2007 |
| CN | 2930126 Y | 8/2007 |
| CN | 201018562 Y | 2/2008 |
| CN | 101212391 A | 7/2008 |
| CN | 201274520 Y | 7/2009 |
| CN | 201278537 Y | 7/2009 |
| CN | 201303341 Y | 9/2009 |
| CN | 201341181 Y | 11/2009 |
| CN | 201360311 Y | 12/2009 |
| CN | 102170395 A | 8/2011 |
| CN | 201966935 U | 9/2011 |
| CN | 201966946 U | 9/2011 |
| CN | 102255982 A | 11/2011 |
| CN | 202059522 U | 11/2011 |
| CN | 202085186 U | 12/2011 |
| CN | 202524415 U | 11/2012 |
| CN | 202551074 U | 11/2012 |
| CN | 202551077 U | 11/2012 |
| CN | 202551090 U | 11/2012 |
| CN | 202587007 U | 12/2012 |
| CN | 202587021 U | 12/2012 |
| CN | 103067268 A | 4/2013 |
| CN | 103650424 A | 3/2014 |
| WO | WO 2011/046730 A1 | 4/2011 |

OTHER PUBLICATIONS

Durand et al., Dual-Stack Lite Broadband Deployments Following IPv4 Exhaustion, Aug. 2011, https://tools.ietf.org/pdf/rfc6333.pdf (Year: 2011).*

Bagnulo et al., Stateful NAT64: Network Address and Protocol Translation from IPv6 Clients to IPv4 Servers, Apr. 2011, https://tools.ietf.org/pdf/rfc6146.pdf (Year: 2011).*

* cited by examiner

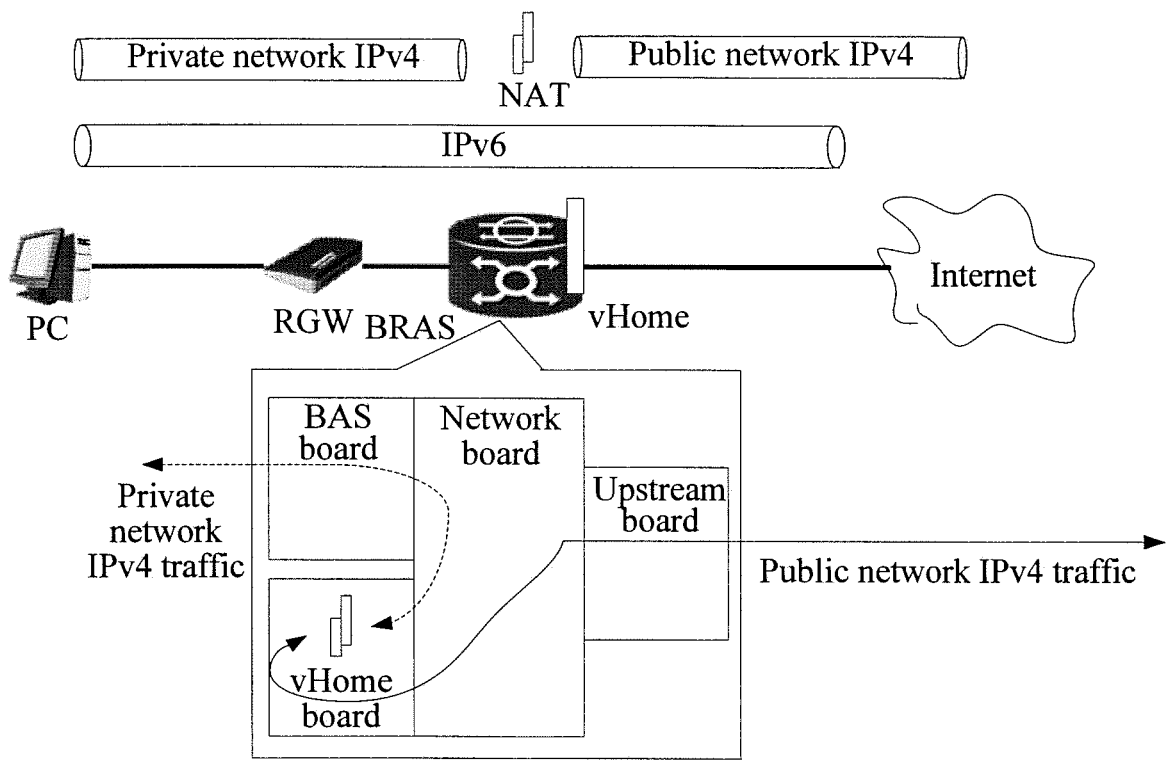
FIG. 3-a
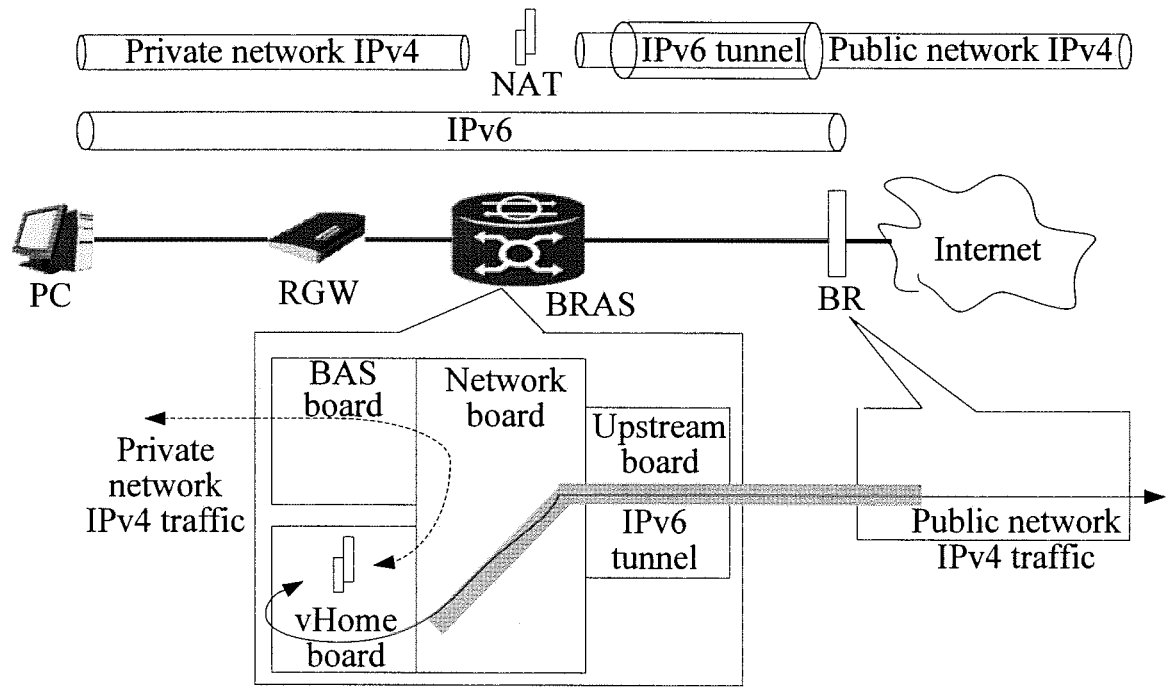
FIG. 3-b

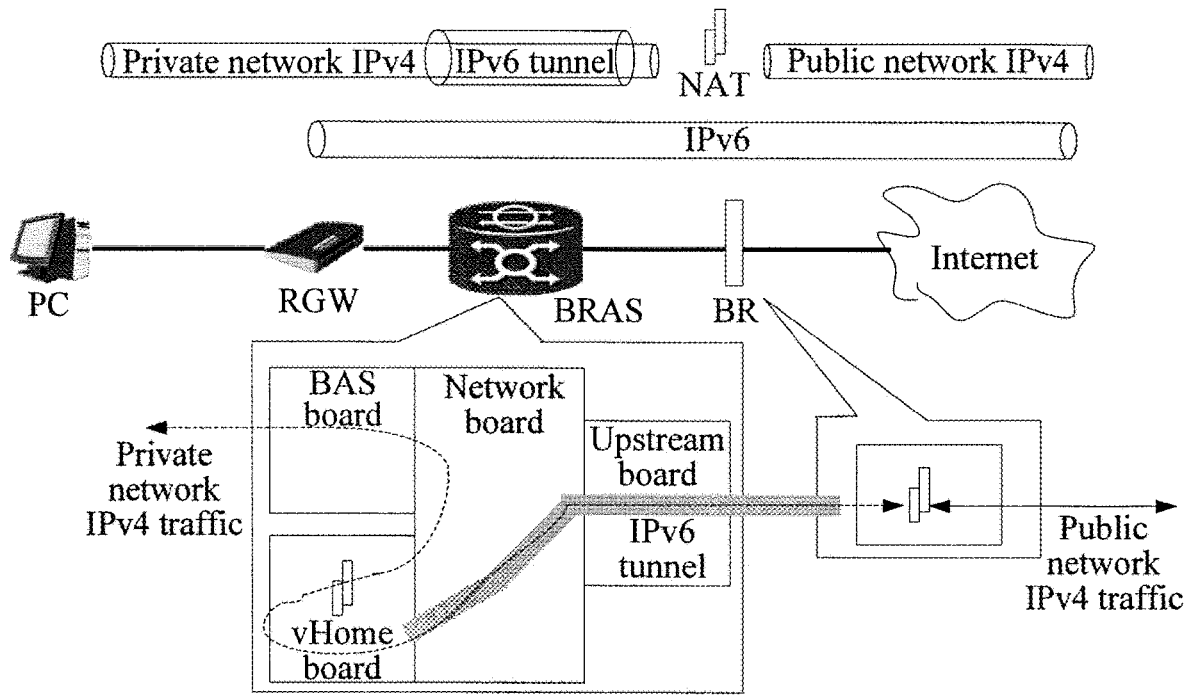
FIG. 3-c
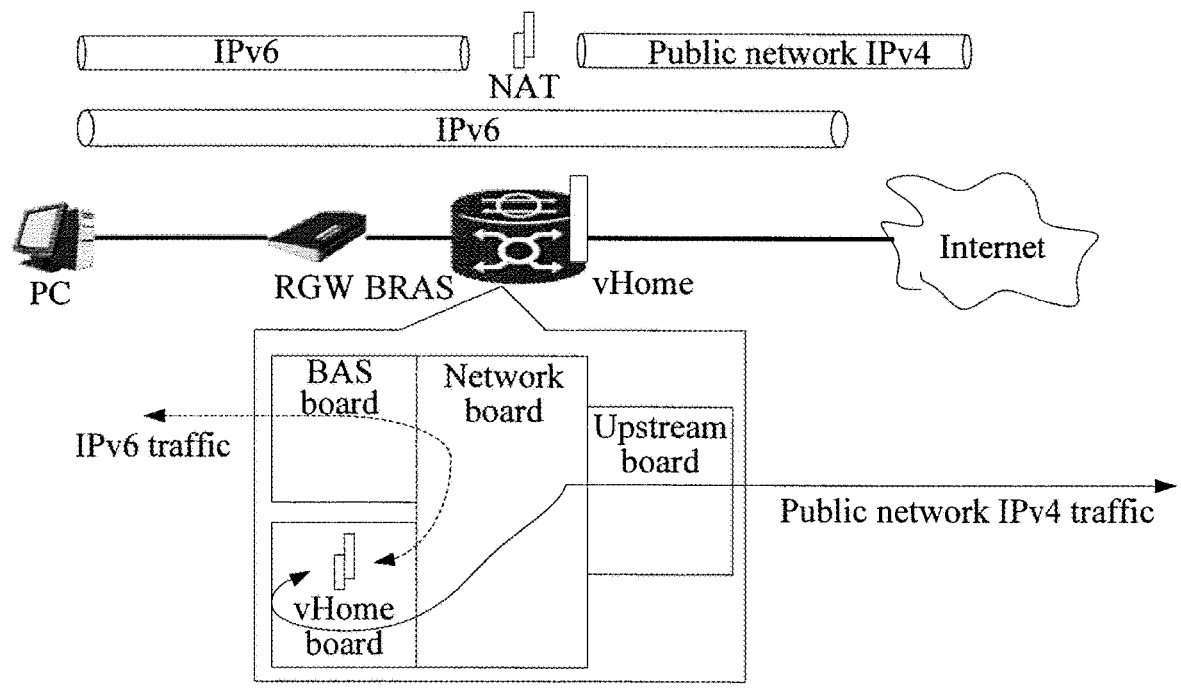
FIG. 3-d

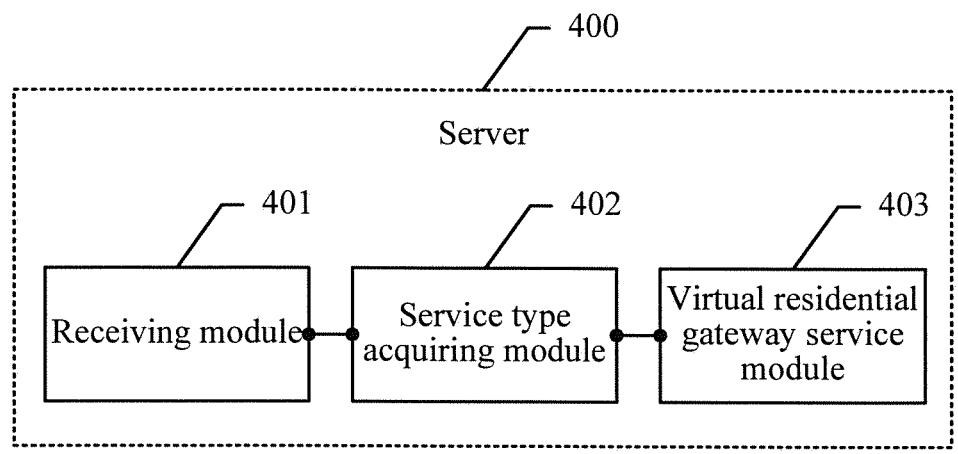
FIG. 4-a
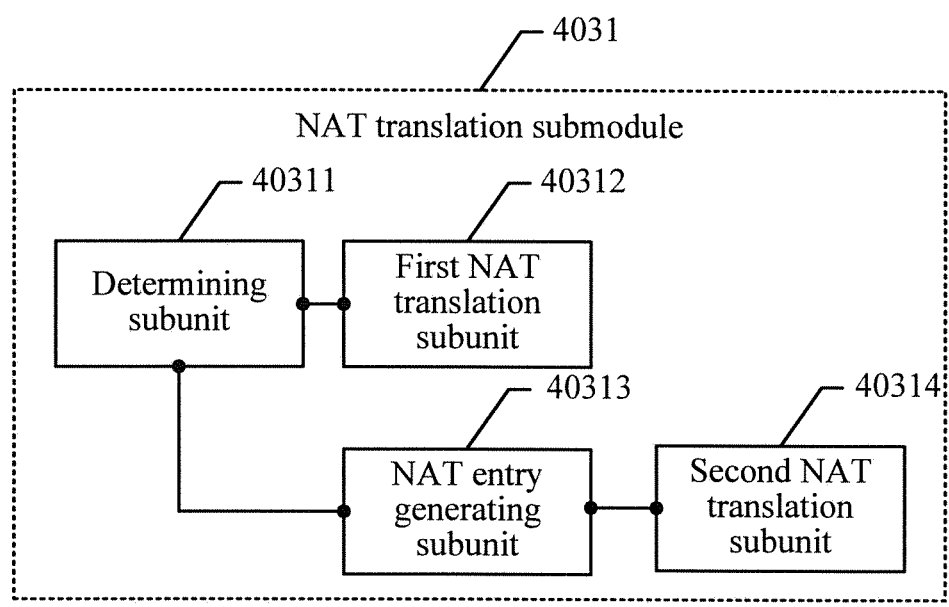
FIG. 4-b

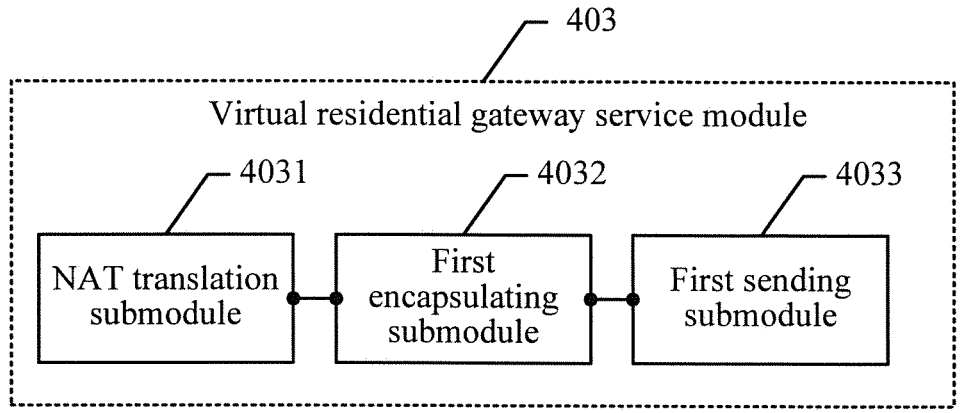
FIG. 4-c
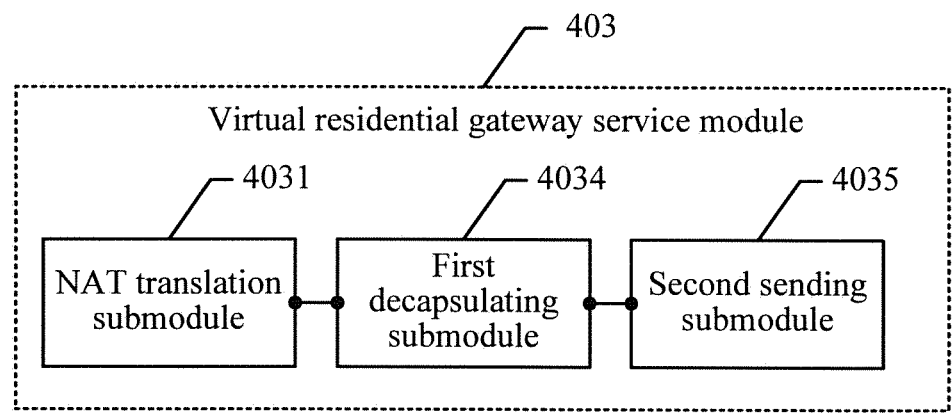
FIG. 4-d
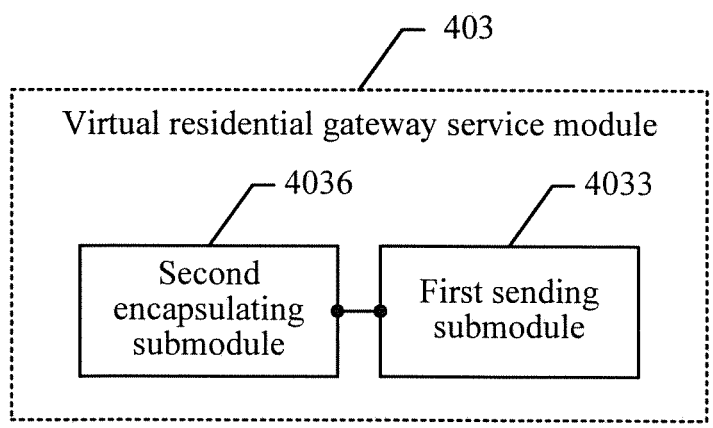
FIG. 4-e

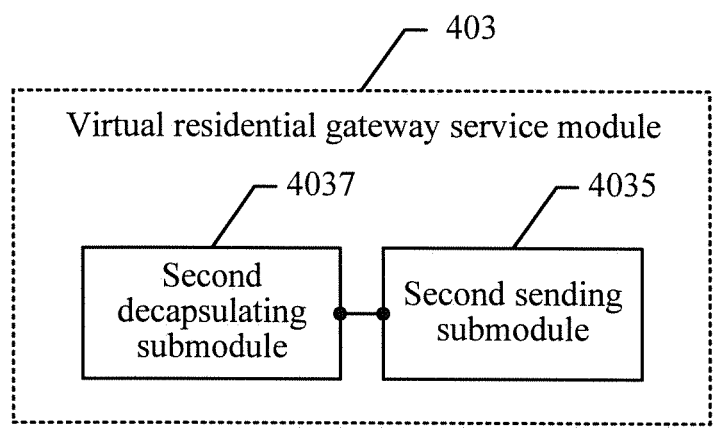
FIG. 4-f
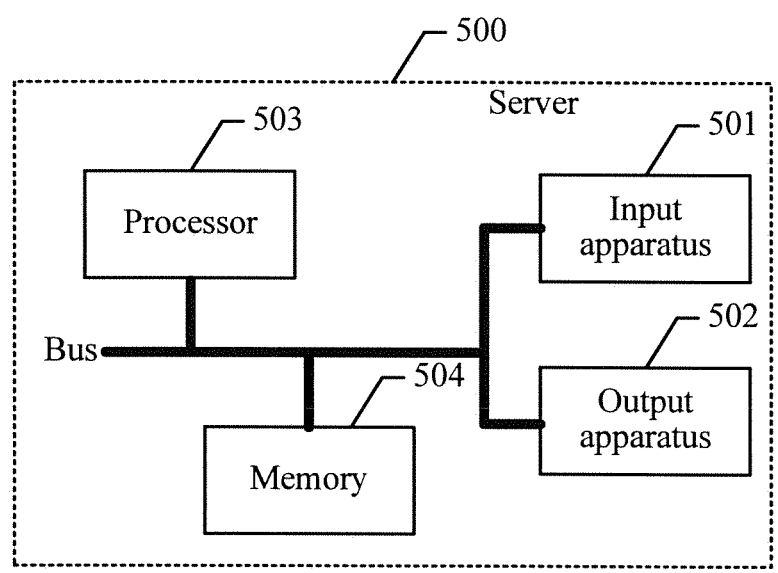
FIG. 5

METHOD FOR IMPLEMENTING RESIDENTIAL GATEWAY SERVICE FUNCTION, AND SERVER

CROSS-REFERENCE TO RELATED APPLICATIONS

This application is a continuation of International Application No. PCT/CN2013/081812, filed on Aug. 20, 2013, which is hereby incorporated by reference in its entirety.

TECHNICAL FIELD

Embodiments of the application relate to the field of communications technologies, and in particular, to a method for implementing a residential gateway service function, and a server.

BACKGROUND

A residential gateway (RGW) on a user side is one of key network elements that affect network access of a user. As a quantity of network users grows constantly, so does a quantity of residential gateways. A huge quantity of the residential gateways also affects reconstruction and development of the IPv6 (Internet Protocol Version 6, IP protocol next generation).

A deployment manner of a residential gateway in a bridging mode is shown in FIG. 1; FIG. 1 is a schematic structural diagram of current deployment of a residential gateway, where a terminal directly dials up to access the Internet; an example in which a residential gateway is connected to two users (which are a terminal 1 and a terminal 2) is used, an optical network terminal (ONT, Optical Network Terminal) is further connected in a home network, and the ONT is connected to a broadband remote access server (BRAS, Broadband Remote Access Server) by using an optical line terminal (OLT, Optical Line Terminal).

However, during the implementation of the application, the inventors find that the prior art has at least the following technical defects:

(1) The ONT in the bridging mode does not support some IPv6 transition technologies, for example, dual stack-lite (DS-Lite, Dual Stack-Lite).

(2) Most RGWs that are purchased by users do not support the IPv6.

(3) After the RGW is upgraded and reconstructed to support the IPv6, a higher fault rate and higher upgrade frequency are caused, for example, L3-RGW has a much higher software configuration fault rate and hardware structure fault rate than L2-RGW.

(4) An increasingly growing amount of traffic of the RGW on the user side renders a traffic policy increasingly complex, which results in a rather complex home network. A huge volume of traffic borne by the RGW inevitably leads to an increase in a fault rate, and after the RGW supports the IPv6, the fault rate is further increased, and moreover, troubleshooting becomes more complex.

(5) Because the RGW is deployed in a home on the user side, when the RGW needs to be upgraded or replaced after the IPv6 evolves or a new service is introduced, a technician needs to provide an onsite service, which consumes a large number of manpower and material resources, and as a result, an operator needs high costs to introduce a new service; and moreover, upgrade of the RGW also increases costs for the user.

It can be learned from the foregoing solutions in the prior art that, it is difficult for the RGW to cooperate with a network in the IPv6 and IPv6 transition technologies, and after the RGW is upgraded to support the IPv6, a higher fault rate and higher upgrade frequency are caused.

SUMMARY

Embodiments of the application provide a method for implementing a residential gateway service function, and a server, which can render a residential gateway transparent in a reconstruction process of the IPv6, and decrease a fault rate and high upgrade frequency that are caused after the residential gateway is upgraded to support the IPv6.

According to a first aspect, an embodiment of the application provides a method for implementing a virtual residential gateway service function, including:

receiving, by a server, a data packet forwarded by a residential gateway RGW or a network side;

identifying, by the server, a service type of the data packet according to information carried in the data packet; and providing, by the server, based on the service type of the data packet, a virtual residential gateway service for a user terminal connected to the RGW.

With reference to the first aspect, in a first possible implementation manner of the first aspect, the receiving, by a server, a data packet forwarded by a residential gateway RGW or a network side includes:

receiving, by the server, an uplink data packet forwarded by the RGW, where the uplink data packet is sent by the user terminal to the RGW; or receiving, by the server, a downlink data packet sent by the network side.

With reference to the first possible implementation manner of the first aspect, in a second possible implementation manner of the first aspect, when the data packet is an uplink data packet, the providing, by the server, based on the service type of the data packet, a virtual residential gateway service for a user terminal connected to the RGW includes:

if a service type of the uplink data packet is Dynamic Host Configuration Protocol DHCP request, allocating, by the server, a private network Internet Protocol version 4 IPv4 address or an Internet Protocol next generation IPv6 address to the user terminal; or if a service type of the uplink data packet is dial-up Internet access request, performing, by the server, user access authentication on the user terminal; or if a service type of the uplink data packet is sending uplink data to the network side, analyzing, by the server, the uplink data packet according to a function of a home firewall, to determine whether to allow the uplink data packet to pass, and if it is determined to allow the uplink data packet to pass, sending the uplink data packet to the network side.

With reference to the first possible implementation manner of the first aspect, in a third possible implementation manner of the first aspect, when the data packet is a downlink data packet, the providing, by the server, based on the service type of the data packet, a virtual residential gateway service for a user terminal connected to the RGW includes:

if a service type of the downlink data packet is sending downlink data to the user terminal, analyzing, by the server, the downlink data packet according to a function of a home firewall, to determine whether to allow the downlink data packet to pass, and if it is determined to allow the downlink data packet to pass, sending the downlink data packet to the RGW; or if a service type of the downlink data packet is sending downlink data to the user terminal, performing, by the server, antivirus scanning on the downlink data packet, and sending the downlink data packet that has undergone the antivirus scanning to the RGW.

With reference to the first aspect, in a fourth possible implementation manner of the first aspect, the providing, by the server, based on the service type of the data packet, a virtual residential gateway service for a user terminal connected to the RGW includes:

performing, by the server, user management and user online information maintenance on the user terminal after the user terminal goes online.

With reference to the first aspect, in a fifth possible implementation manner of the first aspect, the providing, by the server, based on the service type of the data packet, a virtual residential gateway service for a user terminal connected to the RGW includes:

if the service type of the data packet is sending uplink/downlink data, performing, by the server, network address translation NAT on a source IP address and a source port number of the data packet.

With reference to the fifth possible implementation manner of the first aspect, in a sixth possible implementation manner of the first aspect, the performing, by the server, network address translation NAT on a source IP address and a source port number of the data packet includes:

determining whether the data packet matches an existing flow table;

if the data packet matches the flow table, translating the source IP address and the source port number according to a NAT entry recorded in the flow table;

if the data packet does not match the flow table, generating a NAT entry according to a mapping relationship between the source IP address of the data packet, and an IP and a port that are predetermined in the server; and updating the generated NAT entry to the flow table, and translating the source IP address and the source port number according to the NAT entry recorded in an updated flow table.

With reference to the fifth possible implementation manner of the first aspect, in a seventh possible implementation manner of the first aspect, if the data packet is an uplink data packet, the providing, by the server, based on the service type of the data packet, a virtual residential gateway service for a user terminal connected to the RGW further includes:

after the server performs the network address translation NAT on the source IP address and the source port number of the data packet, performing, by the server, IPv6 tunnel encapsulation on the uplink data packet that has undergone the NAT translation; and sending, by the server, the uplink data packet that has undergone the IPv6 tunnel encapsulation to a border router BR, so that the BR decapsulates the uplink data packet that has undergone the IPv6 tunnel encapsulation, and then sends the uplink data packet to the network side.

With reference to the fifth possible implementation manner of the first aspect, in an eighth possible implementation manner of the first aspect, if the server receives a downlink data packet from a BR, the providing, by the server, based on the service type of the data packet, a virtual residential gateway service for a user terminal connected to the RGW further includes:

before the server performs network address translation NAT on the source IP address and the source port number of the data packet, performing, by the server, IPv6 tunnel decapsulation on the downlink data packet;

the performing, by the server, network address translation NAT on a source IP address and a source port number of the data packet is specifically:

performing, by the server, NAT on a source IP address and a source port number of the downlink data packet that has undergone the IPv6 tunnel decapsulation; and the providing, by the server, based on the service type of the data packet, a virtual residential gateway service for a user terminal connected to the RGW further includes:

after the server performs the NAT on the source IP address and the source port number of the downlink data packet that has undergone the IPv6 tunnel decapsulation, sending, by the server, the downlink data packet that has undergone the NAT translation to the RGW.

With reference to the first aspect, in a ninth possible implementation manner of the first aspect, if the data packet is an uplink data packet, the providing, by the server, based on the service type of the data packet, a virtual residential gateway service for a user terminal connected to the RGW includes:

performing, by the server, IPv6 tunnel encapsulation on the uplink data packet; and sending, by the server, the uplink data packet that has undergone the IPv6 tunnel encapsulation to a BR, so that the BR performs IPv6 tunnel decapsulation on the uplink data packet that has undergone the IPv6 tunnel encapsulation and performs NAT on the uplink data packet, and then sends the uplink data packet to the network side.

With reference to the first aspect, in a tenth possible implementation manner of the first aspect, if the server receives a downlink data packet from a BR, the providing, by the server, based on the service type of the data packet, a virtual residential gateway service for a user terminal connected to the RGW includes:

performing, by the server, IPv6 tunnel decapsulation on the downlink data packet; and sending, by the server, the downlink data packet that has undergone the IPv6 tunnel decapsulation to the RGW.

With reference to the fifth possible implementation manner of the first aspect, in an eleventh possible implementation manner of the first aspect, if the data packet is an uplink data packet, and a source IP address of the uplink data packet is an IPv6 address and a source port number of the uplink data packet is a port number of the user terminal, the performing, by the server, network address translation NAT on a source IP address and a source port number of the data packet includes:

translating the IPv6 address into a public network IPv4 address according to a flow table, and translating the port number of the user terminal into a public network port number according to the flow table; or if the data packet is a downlink data packet, and a source IP address of the downlink data packet is a public network IPv4 address and a source port number of the downlink data packet is a public network port number, the performing, by the server, network address translation NAT on a source IP address and a source port number of the data packet includes:

translating the public network IPv4 address into an IPv6 address according to a flow table, and translating the public network port number into a port number of the user terminal according to the flow table.

According to a second aspect, an embodiment of the application further provides a server, including:

a receiving module, configured to receive a data packet forwarded by a residential gateway RGW or a network side;

a service type acquiring module, configured to identify a service type of the data packet according to information carried in the data packet; and a virtual residential gateway service module, configured to provide, based on the service type of the data packet, a virtual residential gateway service for a user terminal connected to the RGW.

With reference to the second aspect, in a first possible implementation manner of the second aspect, the receiving module is specifically configured to receive an uplink data packet forwarded by the RGW, where the uplink data is sent by the user terminal to the RGW; or receive a downlink data packet sent by the network side.

With reference to the first possible implementation manner of the second aspect, in a second possible implementation manner of the second aspect, when the data packet is an uplink data packet, the virtual residential gateway service module is specifically configured to: if a service type of the uplink data packet is Dynamic Host Configuration Protocol DHCP request, allocate a private network Internet Protocol version 4 IPv4 address or an Internet Protocol next generation IPv6 address to the user terminal; or if a service type of the uplink data packet is dial-up Internet access request, perform user access authentication on the user terminal; or if a service type of the uplink data packet is sending uplink data to the network side, analyze the uplink data packet according to a function of a home firewall, to determine whether to allow the uplink data packet to pass, and if it is determined to allow the uplink data packet to pass, send the uplink data packet to the network side.

With reference to the first possible implementation manner of the second aspect, in a third possible implementation manner of the second aspect, when the data packet is a downlink data packet, the virtual residential gateway service module is specifically configured to: if a service type of the downlink data packet is sending downlink data to the user terminal, analyze the downlink data packet according to a function of a home firewall, to determine whether to allow the downlink data packet to pass, and if it is determined to allow the downlink data packet to pass, send the downlink data packet to the RGW; or if a service type of the downlink data packet is sending downlink data to the user terminal, perform antivirus scanning on the downlink data packet, and send the downlink data packet that has undergone the antivirus scanning to the RGW.

With reference to the second aspect, in a fourth possible implementation manner of the second aspect, the virtual residential gateway service module is specifically configured to perform user management and user online information maintenance on the user terminal after the user terminal goes online.

With reference to the second aspect, in a fifth possible implementation manner of the second aspect, if the service type of the data packet is sending uplink/downlink data, the virtual residential gateway service module includes a NAT translation submodule, configured to perform network address translation NAT on a source IP address and a source port number of the data packet.

With reference to the fifth possible implementation manner of the second aspect, in a sixth possible implementation manner of the second aspect, the NAT translation submodule includes a determining subunit, a first NAT translation subunit, a NAT entry generating subunit, and a second NAT translation subunit, where the determining subunit is configured to determine whether the data packet matches an existing flow table; if the data packet matches the flow table, trigger the first NAT translation subunit; or if the data packet does not match the flow table, trigger the NAT entry generating subunit and the second NAT translation subunit;

the first NAT translation subunit is configured to: if the data packet matches the flow table, translate the source IP address and the source port number according to a NAT entry recorded in the flow table;

the NAT entry generating subunit is configured to: if the data packet does not match the flow table, generate a NAT entry according to t a mapping relationship between the source IP address of the data packet, and an IP and a port that are predetermined in the server; and the second NAT translation subunit is configured to update the generated NAT entry to the flow table, and translate the source IP address and the source port number according to the NAT entry recorded in an updated flow table.

With reference to the fifth possible implementation manner of the second aspect, in a seventh possible implementation manner of the second aspect, if the data packet is an uplink data packet, the virtual residential gateway service module further includes: a first encapsulating submodule and a first sending submodule, where the first encapsulating submodule is configured to: after the NAT translation submodule performs the NAT translation on the uplink data packet, perform IPv6 tunnel encapsulation on the uplink data packet that has undergone the NAT translation; and the first sending submodule is configured to send the uplink data packet that has undergone the IPv6 tunnel encapsulation to a border router BR, so that the BR decapsulates the uplink data packet that has undergone the IPv6 tunnel encapsulation, and then sends the uplink data packet to the network side.

With reference to the fifth possible implementation manner of the second aspect, in an eighth possible implementation manner of the second aspect, if the server receives a downlink data packet from a BR, the virtual residential gateway service module further includes: a first decapsulating submodule and a second sending submodule, where the first decapsulating submodule is configured to: before the NAT translation submodule performs NAT translation on the downlink data packet, perform IPv6 tunnel decapsulation on the downlink data packet;

the NAT translation submodule is specifically configured to perform NAT on a source IP address and a source port number of the downlink data packet that has undergone the IPv6 tunnel decapsulation;

and the second sending submodule is configured to send the downlink data packet that has undergone the NAT translation to the RGW.

With reference to the second aspect, in a ninth possible implementation manner of the second aspect, if the data packet is an uplink data packet, the virtual residential gateway service module includes: a second encapsulating submodule and a first sending submodule, where the second encapsulating submodule is configured to perforin IPv6 tunnel encapsulation on the uplink data packet; and the first sending submodule is configured to send the uplink data packet that has undergone the IPv6 tunnel encapsulation to a BR, so that the BR performs IPv6 tunnel decapsulation on the uplink data packet that has undergone the IPv6 tunnel encapsulation and performs NAT on the uplink data packet, and then sends the uplink data packet to the network side.

With reference to the second aspect, in a tenth possible implementation manner of the second aspect, if the server receives a downlink data packet from a BR, the virtual residential gateway service module includes: a second decapsulating submodule and a second sending submodule, where the second decapsulating submodule is configured to perform IPv6 tunnel decapsulation on the downlink data packet; and the second sending submodule is configured to send the downlink data packet that has undergone the IPv6 tunnel decapsulation to the RGW.

With reference to the fifth possible implementation manner of the second aspect, in an eleventh possible implementation manner of the second aspect, if the data packet is an uplink data packet, and a source IP address of the uplink data packet is an IPv6 address and a source port number of the uplink data packet is a port number of the user terminal, the NAT translation submodule is specifically configured to translate the IPv6 address into a public network IPv4 address according to a flow table, and translate the port number of the user terminal into a public network port number according to the flow table; or if the data packet is a downlink data packet, and a source IP address of the downlink data packet is a public network IPv4 address and a source port number of the downlink data packet is a public network port number, the NAT translation submodule is specifically configured to translate the public network IPv4 address into an IPv6 address according to a flow table, and translate the public network port number into a port number of the user terminal according to the flow table.

According to a third aspect, an embodiment of the application further provides a server, including: an input apparatus, an output apparatus, a memory, and a processor, where the processor performs the following steps:

receiving, by using the input apparatus, a data packet forwarded by a residential gateway RGW or a network side;

identifying a service type of the data packet according to information carried in the data packet; and providing, based on the service type of the data packet, a virtual residential gateway service for a user terminal connected to the RGW.

With reference to the third aspect, in a first possible implementation manner of the third aspect, the processor is specifically configured to perform the following steps:

receiving an uplink data packet forwarded by the RGW, where the uplink data packet is sent by the user terminal to the RGW; or receiving a downlink data packet sent by the network side.

With reference to the first possible implementation manner of the third aspect, in a second possible implementation manner of the third aspect, the processor is specifically configured to perform the following step: when the data packet is an uplink data packet, if a service type of the uplink data packet is Dynamic Host Configuration Protocol DHCP request, allocating a private network Internet Protocol version 4 IPv4 address or an Internet Protocol next generation IPv6 address to the user terminal; or if a service type of the uplink data packet is dial-up Internet access request, performing user access authentication on the user terminal; or if a service type of the uplink data packet is sending uplink data to the network side, analyzing the uplink data packet according to a function of a home firewall, to determine whether to allow the uplink data packet to pass, and if it is determined to allow the uplink data packet to pass, sending the uplink data packet to the network side.

With reference to the first possible implementation manner of the third aspect, in a third possible implementation manner of the third aspect, the processor is specifically configured to perform the following step: when the data packet is a downlink data packet, if a service type of the downlink data packet is sending downlink data to the user terminal, analyzing the downlink data packet according to a function of a home firewall, to determine whether to allow the downlink data packet to pass, and if it is determined to allow the downlink data packet to pass, sending the downlink data packet to the RGW; or if a service type of the downlink data packet is sending downlink data to the user terminal, performing antivirus scanning on the downlink data packet, and sending the downlink data packet that has undergone the antivirus scanning to the RGW.

With reference to the third aspect, in a fourth possible implementation manner of the third aspect, the processor is specifically configured to perform the following step:

performing user management and user online information maintenance on the user terminal after the user terminal goes online.

With reference to the third aspect, in a fifth possible implementation manner of the third aspect, the processor is specifically configured to perform the following steps:

if the service type of the data packet is sending uplink/downlink data, performing network address translation NAT on a source IP address and a source port number of the data packet.

With reference to the fifth possible implementation manner of the third aspect, in a sixth possible implementation manner of the third aspect, the processor is specifically configured to perform the following steps:

determining whether the data packet matches an existing flow table;

if the data packet matches the flow table, translating the source IP address and the source port number according to a NAT entry recorded in the flow table;

if the data packet does not match the flow table, generating a NAT entry according to a mapping relationship between the source IP address of the data packet, and an IP and a port that are predetermined in the server; and updating the generated NAT entry to the flow table, and translating the source IP address and the source port number according to the NAT entry recorded in an updated flow table.

With reference to the fifth possible implementation manner of the third aspect, in a seventh possible implementation manner of the third aspect, the processor is specifically configured to perform the following steps:

if the data packet is an uplink data packet, after performing the network address translation NAT on the source IP address and the source port number of the data packet, performing IPv6 tunnel encapsulation on the uplink data packet that has undergone the NAT translation; and sending the uplink data packet that has undergone the IPv6 tunnel encapsulation to a border router BR, so that the BR decapsulates the uplink data packet that has undergone the IPv6 tunnel encapsulation, and then sends the uplink data packet to the network side.

With reference to the fifth possible implementation manner of the third aspect, in an eighth possible implementation manner of the third aspect, the processor is specifically configured to perform the following steps: if the server receives a downlink data packet from a BR, before performing the network address translation NAT on the source IP address and the source port number of the data packet, performing IPv6 tunnel decapsulation on the downlink data packet;

performing NAT on a source IP address and a source port number of the downlink data packet that has undergone the IPv6 tunnel decapsulation; and after performing the NAT on the source IP address and the source port number of the downlink data packet that has undergone the IPv6 tunnel decapsulation, sending the downlink data packet that has undergone the NAT translation to the RGW.

With reference to the third aspect, in a ninth possible implementation manner of the third aspect, the processor is specifically configured to perform the following steps: if the data packet is an uplink data packet, performing IPv6 tunnel encapsulation on the uplink data packet; and sending the uplink data packet that has undergone the IPv6 tunnel encapsulation to a BR, so that the BR performs IPv6 tunnel decapsulation on the uplink data packet that has undergone the IPv6 tunnel encapsulation and performs NAT on the uplink data packet, and then sends the uplink data packet to the network side.

With reference to the third aspect, in a tenth possible implementation manner of the third aspect, the processor is specifically configured to perform the following steps: if the server receives a downlink data packet from a BR, performing IPv6 tunnel decapsulation on the downlink data packet; and sending the downlink data packet that has undergone the IPv6 tunnel decapsulation to the RGW.

With reference to the fifth possible implementation manner of the third aspect, in an eleventh possible implementation manner of the third aspect, the processor is specifically configured to perform the following step: if the data packet is an uplink data packet, and a source IP address of the uplink data packet is an IPv6 address and a source port number of the uplink data packet is a port number of the user terminal, translating the IPv6 address into a public network IPv4 address according to a flow table, and translating the port number of the user terminal into a public network port number according to the flow table; or if the data packet is a downlink data packet, and a source IP address of the downlink data packet is a public network IPv4 address and a source port number of the downlink data packet is a public network port number, translating the public network IPv4 address into an IPv6 address according to a flow table, and translating the public network port number into a port number of the user terminal according to the flow table.

It can be seen from the foregoing technical solutions that, the embodiments of the application have the following advantages:

In the embodiments of the application, if an RGW receives a data packet, the RGW forwards the data packet to a server, to perform identification, and after identifying a service type of the data packet, the server provides, based on the service type of the data packet, a virtual residential gateway service for a user terminal connected to the RGW; or if a network side receives a data packet, the network side forwards the data packet to a server, to perform identification, and after identifying a service type of the data packet, the server provides, based on the service type of the data packet, a virtual residential gateway service for a user terminal connected to an RGW. Because the RGW forwards the data packet to the server, and the virtual residential gateway service is provided by the server, it can be seen that a residential gateway service function of the RGW is shifted to the server; moreover, for the data packet sent by the network side, the server also provides, based on the service type of the data packet, the virtual residential gateway service for the user terminal, and the residential gateway service function is no longer provided by the RGW. Therefore, after the residential gateway service function of the RGW is shifted to the server, functions of the RGW are simplified, so that a home network is transparent during deployment and evolution of the IPv6 and is unaware of the deployment and evolution of the IPv6. Because the server is usually deployed at a network aggregation layer and has a more convenient maintenance mechanism, maintenance and upgrading costs can be reduced and a fault rate of a household device is also reduced.

BRIEF DESCRIPTION OF THE DRAWINGS

FIG. 3-*a* is a schematic diagram of an implementation process when a method for implementing a residential gateway service function is applied to a NAT444 scenario according to an embodiment of the application;

FIG. 3-*b* is a schematic diagram of an implementation process when a method for implementing a residential gateway service function is applied to an MAP-E scenario according to an embodiment of the application;

FIG. 3-*c* is a schematic diagram of an implementation process when a method for implementing a residential gateway service function is applied to a DS-Lite scenario according to an embodiment of the application;

FIG. 3-*d* is a schematic diagram of an implementation process when a method for implementing a residential gateway service function is applied to a NAT64 scenario according to an embodiment of the application;

FIG. 4-*a* is a schematic structural composition diagram of a server according to an embodiment of the application;

FIG. 4-*b* is a schematic structural composition diagram of a NAT translation submodule according to an embodiment of the application;

FIG. 4-*c* is a schematic structural composition diagram of a virtual residential gateway service module according to an embodiment of the application;

FIG. 4-*d* is a schematic structural composition diagram of another virtual residential gateway service module according to an embodiment of the application;

FIG. 4-*e* is a schematic structural composition diagram of another virtual residential gateway service module according to an embodiment of the application;

FIG. 4-*f* is a schematic structural composition diagram of another virtual residential gateway service module according to an embodiment of the application; and FIG. 5 is a schematic structural composition diagram of another server according to an embodiment of the application.

DETAILED DESCRIPTION

Embodiments of the application provide a method for implementing a residential gateway service function, and a server, which can render a residential gateway transparent in a reconstruction process of the IPv6, and decrease a fault rate and high upgrade frequency that are caused after the residential gateway is upgraded to support the IPv6.

In order to make the objectives, features, and advantages of the application more obvious and comprehensible, the technical solutions in the embodiments of the application are clearly described below with reference to the accompanying drawings in the embodiments of the application. Obviously, the embodiments to be described are part of rather than all of the embodiments of the application. All other embodiments obtained by a person skilled in the art based on the embodiments of the application without creative efforts shall fall within the protection scope of the application.

The teens "include", "comprise" and any other variants thereof in the specification and claims of the application are intended to cover a non-exclusive inclusion, so that a process, a method, a system, a product or a device that includes a series of units is not limited to including only those units but may include other units that are not explicitly listed, or include inherent units of the process, method, product, or device.

Detailed descriptions are provided below.

In an embodiment of a method for implementing a virtual residential gateway service function of the application, the method may be applied to a server, and in particular, to a broadband remote access server (BRAS, Broadband Remote Access Server). The method may include: receiving, by a server, a data packet forwarded by a residential gateway (RGW, Residential Gateway) or a network side; identifying, by the server, a service type of the data packet according to information carried in the data packet; and providing, by the server, based on the service type of the data packet, a virtual residential gateway service for a user terminal connected to the RGW.

Figure 1:
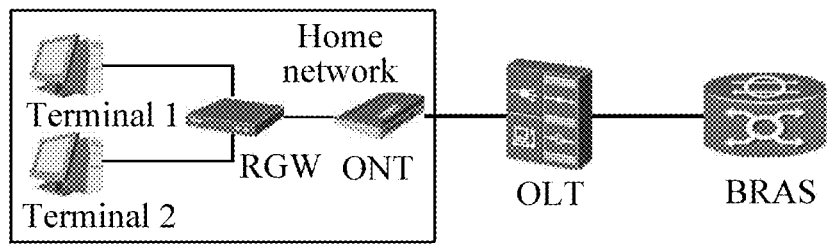
FIG. 1 is a schematic structural diagram of deployment of a residential gateway in the prior art.
Figure 2:
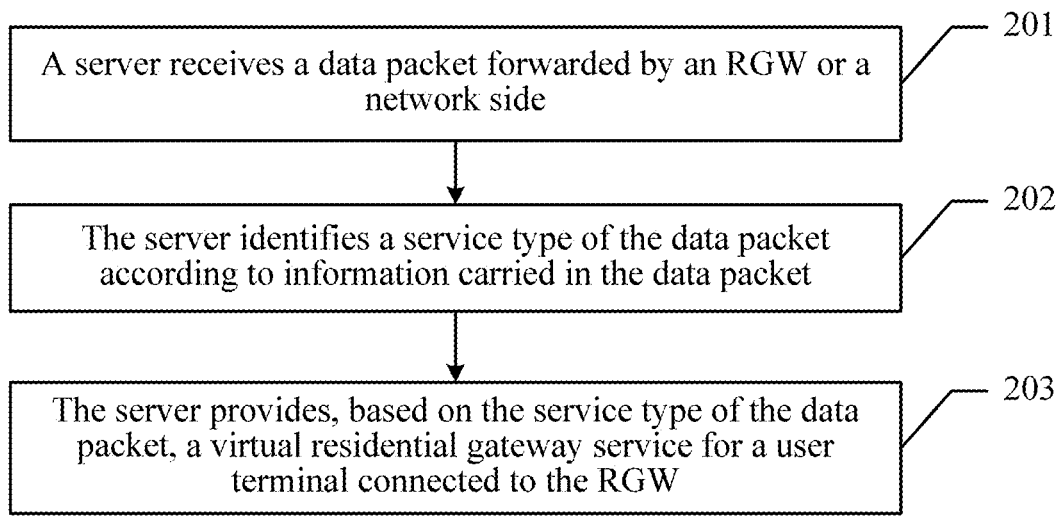
FIG. 2 is a flowchart of a method for implementing a residential gateway service function according to an embodiment of the application.

Referring to FIG. 2, a method for implementing a virtual residential gateway service function provided by an embodiment of the application may include the following steps:

201: A server receives a data packet forwarded by an RGW or a network side.

In this embodiment of the application, the RGW is generally deployed on a user side, and the RGW may be connected to one user terminal, or connected to multiple user terminals. In subsequent embodiments, the description is provided by using an example in which the RGW is connected to one user terminal, and certainly, the method is also applicable to an application scenario in which the RGW is connected to multiple user terminals. The server is deployed on a network side, and the server is connected to the RGW. In an actual application, the server described in this embodiment of the application may specifically refer to a BRAS, or an independent network element deployed on the network side, or may be deployed as an independent service module in a BRAS, which is merely described herein.

In some embodiments of the application, that a server receives a data packet forwarded by an RGW or a network side may generally refer to the following two situations: the server receives an uplink data packet forwarded by the RGW, where the uplink data packet is sent by a user terminal to the RGW; or the server receives a downlink data packet sent by the network side.

It should be noted that, in the prior art, after receiving a data packet from a user terminal, a residential gateway not only executes a Layer 2 forwarding service but also executes a Layer 3 forwarding service. Because methods for processing Layer 3 and higher-layer services, such as a Layer 3 firewall, a digital living network alliance (DLNA, Digital Living Network Alliance), and other Layer 3 and higher-layer packet content processing services, are diverse and complex, and therefore, a structure of the RGW is complex. That is, in the prior art, after receiving the data packet sent by the user terminal, the RGW usually needs to execute a residential gateway service function to perform service processing on the data packet, while in this embodiment of the application, after receiving the data packet, the RGW directly forwards the data packet to the server and the server performs subsequent service processing. Therefore, for the RGW, functions of the RGW are simplified significantly, and the RGW is freed from heavy workload, so that a structure of the RGW is simplified, a software configuration fault rate and a hardware structure fault rate of the RGW are reduced, and the RGW is transparent during future deployment and evolution of the IPv6 and is unaware of the future deployment and evolution of the IPv6.

202: The server identifies a service type of the data packet according to information carried in the data packet.

In this embodiment of the application, after the server receives the data packet from the RGW or the network side, the server parses the information carried in the data packet, to identify the service type of the data packet.

It should be noted that, in the prior art, after receiving the data packet, generally, the server only forwards the data packet but does not execute any residential gateway function, because all existing residential gateway functions are implemented in the RGW. For example, after receiving an uplink data packet sent by the RGW, generally, the existing server only forwards the uplink data packet to a network element on the network side, for example, the server forwards the uplink data packet to carrier-grade network address translation (CGN, Carrier-Grade Network Address Translation). Because an existing RGW is also responsible for implementing Layer 3 and higher-layer forwarding functions generally, for example, the RGW sends the uplink data packet to the server after performing network address translation (NAT, Network Address Translation) on the uplink data packet; the server then forwards the uplink data packet to the CGN, and generally, the CGN also performs NAT on the uplink data packet. In other words, in an existing IPv4 address extension solution, two-level NAT is generally performed, but some application programs are not completely compatible to the two-level NAT, for example: (1) after the two-level NAT is used, a speed of downloading BT software is reduced; (2) a quantity of super nodes in an existing network decreases, which affects the use of Skype; (3) PeanutHull (DDNS) cannot be used; and (4) home network monitoring software cannot be used.

A processing manner of the server in this embodiment of the application is different from that in the prior art. After receiving a data packet, the server determines information carried in the data packet to identify a service type of the data packet, where the information carried in the data packet may specifically refer to information about a transmit end that sends the data packet, interface information, or the like; the server may acquire, according to the information about the transmit end, a group to which the transmit end belongs, and then identify the service type of the data packet, so that the server provides a virtual residential gateway service for a user terminal according to the service type of the data packet. This is different from the manner in the prior art in which the server only performs forwarding, and in this embodiment of the application, functions implemented by the server are shifted from the RGW to the server and implemented by the server.

It should be noted that, in this embodiment of the application, after the server determines the information carried in the data packet to identify the service type of the data packet, the server may determine, according to the service type of the data packet, specific service processing that should be performed. The service type of the data packet may specifically refer to multiple situations, for example, the service type may refer to that the user terminal needs to dial up to access the Internet, or the user terminal initiates a get request to access a network, or the network side responds to a request from the user terminal, or the network side sends, to the user terminal, data that needs to be downloaded by the user terminal.

203: The server provides, based on the service type of the data packet, a virtual residential gateway service for a user terminal connected to the RGW.

In this embodiment of the application, network layer and higher-layer functions of the RGW are shifted to the server for implementation. In an existing implementation manner, a virtual residential gateway service is generally provided by the RGW for the user terminal, while in this embodiment of the application, the server can implement Layer 3 and higher-layer functions, and provide, based on the service type of the data packet, the virtual residential gateway service for the user terminal. By simplifying the RGW, the RGW is transparent during deployment and evolution of the IPv6 and is unaware of the deployment and evolution of the IPv6. Therefore, maintenance for the RGW may be reduced and maintenance costs may be decreased, and only a server disposed at a network access layer needs to be maintained, thereby facilitating the maintenance and reducing the maintenance costs.

It should be noted that, in this embodiment of the application, because the virtual residential gateway service is provided by the server for the user terminal, upgrade of the RGW by deploying the IPv6 needs to be performed in the server, that is, the IPv6 needs to be deployed in the server, and in this way, the deployment of the IPv6 is performed much easier. In this embodiment of the application, the server may be compatible with various IPv6 transition technologies, and smooth evolution of different transition technologies may be implemented. Common IPv6 transition technologies include NAT444, dual stack, stateless address and port multiplexing-encapsulation technology (MAP-E, Mapping Address and Port-Encapsulation), dual stack-lite (DS-Lite, Dual Stack-Lite), NAT64, and the like. That the server is compatible with the IPv6 transition technologies in this embodiment of the application is described in detail below with reference to various implementation manners of step 203; refer to subsequent illustration.

In some embodiments of the application, that the server provides, based on the service type of the data packet, a virtual residential gateway service for a user terminal connected to the RGW in step 203 may specifically include that: after the user terminal goes online, the server performs user management and user online information maintenance on the user terminal. For example, the server manages a session set up by a user, updates an operation log of the user, and performs authentication management on the user. It should be noted that, in this embodiment of the application, not all functions of the RGW can be shifted to the server for implementation, for example, the RGW still reserves an interface function and some management functions, such as link layer features (which refer to functions of a physical layer and a link layer), and the management functions reserved by the RGW may specifically include the DLNA and the TR-69 protocol (Technical Report 069).

In some other embodiments of the application, when the data packet is an uplink data packet, step 203 of providing, by the server, based on the service type of the data packet, a virtual residential gateway service for a user terminal connected to the RGW may specifically include the following step:

A1. if a service type of the uplink data packet is Dynamic Host Configuration Protocol (DHCP, Dynamic Host Configuration Protocol) request, allocating, by the server, a private network IPv4 address or an IPv6 address to the user terminal; or A2. if a service type of the uplink data packet is dial-up Internet access request, performing, by the server, user access authentication on the user terminal; or A3. if a service type of the uplink data packet is sending uplink data to the network side, analyzing, by the server, the uplink data packet according to a function of a home firewall, to determine whether to allow the uplink data packet to pass; and if it is determined to allow the uplink data packet to pass, sending the uplink data packet to the network side.

In step A1, if it is learned in step 202 that the user terminal initiates a DHCP request, the server needs to allocate an IP address to the user terminal. In an IPv6 transition technology NAT444 scenario, MAP-E scenario, and DS-Lite scenario, the server allocates a private network IPv4 address to the user terminal; and in an IPv6 transition technology NAT64 scenario, the server allocates an IPv6 address to the user terminal. Herein, the server implements a network management function. The function that needs to be implemented by the RGW in the prior art may be shifted to the server, and the server completes allocation of an IP address to the user terminal. In step A2, if it is learned, according to step 202, that the user terminal initiates a dial-up Internet access request, the server needs to perform user access authentication on the user terminal. The server implements a network management function. The function that needs to be implemented by the RGW in the prior art may be shifted to the server, and the server completes access authentication on the user terminal. In step A3, the user terminal initiates a get request to the network side, and adds, to the get request, a URL (Uniform Resource Locator, uniform resource locator) address of content to that needs to be downloaded. Then, the server learns, according to step 202, that the user terminal sends uplink data to the network side, and the server may intercept the uplink data packet from the user terminal by using a function of a home firewall, analyze the uplink data packet, and determine, according to a decision set by the user, whether to allow the uplink data packet to pass; and if the decision set by the user does not limit this type of data packet, the server forwards the uplink data packet to the network side, so that the user terminal downloads data through a network. Herein, the server performs a security function. The function that needs to be implemented by the RGW in the prior art may be shifted to the server, and the server completes interception of the data packet from the user terminal.

In some other embodiments of the application, when the data packet is a downlink data packet, step 203 of providing, by the server, based on the service type of the data packet, a virtual residential gateway service for a user terminal connected to the RGW may specifically include the following step:

A4. if a service type of the downlink data packet is sending downlink data to the user terminal, analyzing, by the server, the downlink data packet according to a function of a home firewall, to determine whether to allow the downlink data packet to pass; and if it is determined to allow the downlink data packet to pass, sending the downlink data packet to the RGW; or A5. if a service type of the downlink data packet is sending downlink data to the user terminal, performing, by the server, antivirus scanning on the downlink data packet, and sending the downlink data packet that has undergone the antivirus scanning to the RGW.

In step A4, for the downlink data packet, the server provides a function of a home firewall, and the server performs a security function herein. The function that needs to be implemented by the RGW in the prior art may be shifted to the server, and the server completes interception of the data packet from the user terminal. In step A5, when the network side sends downlink data to the user terminal, the server may perform a function of antivirus software to perform antivirus scanning on the downlink data packet sent by the network side, and send the downlink data packet to the RGW after the antivirus scanning. Herein, the server also performs a security function, while in the prior art, this function is implemented by the RGW.

In some other embodiments of the application, step 203 of providing, by the server, based on the service type of the data packet, a virtual residential gateway service for a user terminal connected to the RGW may specifically include the following step:

A6. if the service type of the data packet is sending uplink/downlink data, performing, by the server, network address translation (NAT, Network Address Translation) on a source IP address and a source port number of the data packet.

Specifically, step A6 of performing, by the server, NAT on a source IP address and a source port number of the data packet may include:

A61. determining whether the data packet matches an existing flow table, if the data packet matches the flow table, performing step A62, or if the data packet does not match the flow table, performing steps A63 and A64;

A62. if the data packet matches the flow table, translating the source IP address and the source port number according to a NAT entry recorded in the flow table;

A63. if the data packet does not match the flow table, generating a NAT entry according a mapping relationship between the source IP address of the data packet, and an IP and a port that are predetermined in the server; and A64. updating the generated NAT entry to the flow table, and translating the source IP address and the source port number according to the NAT entry recorded in an updated flow table.

It should be noted that, in this embodiment of the application, the flow table includes multiple NAT entries, each entry is a forwarding rule, and generally, a destination port to which the data packet is forwarded is obtained by querying the flow table. For example, for the data packet sent by the user terminal, an IP address of the data packet is a private network IP address allocated by the server to the user terminal, and after the data packet matches the flow table, the private network IP address is translated into a public network IP address according to a NAT entry recorded in the flow table.

In a case in which the data packet does not match the flow table, the server needs to execute a NAT function. The server generates a NAT entry according to the private network IP address in the data packet (that is, the source IP address), and generates a new source IP address (that is, a public network IP address) and a new source port number according to the source address (that is, the private network IP address) and a source port number in the data packet and with reference to a mapping relationship that is recorded in the server and between an IP and a port, where the two groups of source IP addresses and source port numbers may form one NAT entry. When a source IP address and a source port number of a data packet from a household device match the flow table, the server modifies the source IP address and the source port number of the packet to be a new source IP address and a new source port number. In addition, it may be understood that, after a NAT entry is generated, and the generated NAT entry is stored in the flow table, so that a data packet can match the flow table next time, and the source IP address and the source port number are translated according to the flow table.

It should be noted that, in this embodiment of the application, the server executes a network function (for example, NAT translation) herein. The function that needs to be implemented by the RGW in the prior art may be shifted to the server, and the server completes NAT translation on the data packet. For different IPv6 transition technologies, in this embodiment of the application, the server performs NAT translation on the data packet in different implementation manners during specific implementation. Multiple IPv6 transition technologies used during the NAT translation are described in detail below with reference to specific application scenarios.

In a NAT444 application scenario, the RGW no longer executes a NAT function; instead, after receiving an uplink data packet from the user terminal, the RGW directly forwards the uplink data packet to the server; and the server translates a private network IPv4 address of the uplink data packet into a public network IPv4 address, and then the server sends the uplink data packet to the network side. When the network side sends a downlink data packet to the server, the server executes a NAT function, and translates a public network IPv4 address of the downlink data packet into a private network IPv4 address, and then the server forwards the downlink data packet to the RGW.

In an MAP-E scenario, in addition to step A6 of performing NAT on a source IP address and a source port number of the data packet, step 203 of providing, by the server, based on the service type of the data packet, a virtual residential gateway service for a user terminal connected to the RGW may further include the following steps:

A7. if the data packet is an uplink data packet, performing, by the server, IPv6 tunnel encapsulation on the uplink data that has undergone the NAT translation; and A8. sending, by the server, the uplink data packet that has undergone the IPv6 tunnel encapsulation to a border router (BR, Border Router), so that the BR decapsulates the uplink data packet that has undergone the IPv6 tunnel encapsulation and then sends the uplink data packet to the network side.

In the MAP-E scenario, the server needs to perform IPv6 tunnel encapsulation after performing the NAT translation, that is, add an IPv6 packet header to the uplink data packet, and then sends the uplink data packet to the BR after the encapsulation; the BR decapsulates the uplink data packet that has undergone the IPv6 tunnel encapsulation, that is, removes the IPv6 packet header, and then the BR sends the uplink data packet to the network side. It can be seen in this embodiment of the application that, the server only needs to perform NAT translation once to complete the entire data transmission, which can implement NAT traversal of an application program as compared with a situation in the prior art that the RGW and the CGN separately perform NAT once (that is, two levels of NAT), so that most existing application programs are made compatible, for example, BT and Skype.

In the MAP-E scenario, if the server receives a downlink data packet from a BR, in addition to step A6 of performing NAT on a source IP address and a source port number of the data packet, step 203 of providing, by the server, based on the service type of the data packet, a virtual residential gateway service for a user terminal connected to the RGW may further include the following step:

A60. before step A6 is performed, performing, by the server, IPv6 tunnel decapsulation on the downlink data packet.

Step A6 of performing, by the server, NAT on a source IP address and a source port number of the data packet is specifically:

performing, by the server, NAT on a source IP address and a source port number of the downlink data packet that has undergone the IPv6 tunnel decapsulation; and then, after the server performs the NAT on the source IP address and the source port number of the downlink data packet that has undergone the IPv6 tunnel decapsulation, step 203 further includes the following step A9:

A9. sending, by the server, the downlink data packet that has undergone the NAT translation to the RGW.

In the MAP-E scenario, the foregoing describes a method for processing an uplink data packet, and herein, a method for processing a downlink data packet is described. If the server receives a downlink data packet from a BR, the server needs to execute a NAT function. Because an IPv6 tunnel is encapsulated in the downlink data packet in the MAP-E scenario, IPv6 tunnel decapsulation needs to be performed before NAT, and then the NAT is performed; and only after the NAT is performed, the server sends the downlink data packet that has undergone the NAT translation to the RGW.

In a DS-Lite scenario, step 203 of providing, by the server, based on the service type of the data packet, a virtual residential gateway service for a user terminal connected to the RGW may include the following steps:

A10. if the data packet is an uplink data packet, performing, by the server, IPv6 tunnel encapsulation on the uplink data packet; and A11. sending, by the server, the uplink data packet that has undergone the IPv6 tunnel encapsulation to a BR, so that the BR performs IPv6 tunnel decapsulation on the uplink data packet that has undergone the IPv6 tunnel encapsulation and performs NAT on the uplink data packet, and then sends the uplink data packet to the network side.

A difference between the DS-Lite scenario and the MAP-E scenario lies in that, for an uplink data packet, in the DS-Lite scenario, the server needs to first perform IPv6 tunnel encapsulation and then sends the encapsulated uplink data packet to the BR; therefore, the server needs to first perform IPv6 tunnel encapsulation, then the BR performs NAT on the uplink data packet after decapsulating the uplink data packet.

In the DS-Lite scenario, if the server receives a downlink data packet from a BR, the BR first performs NAT translation on the downlink data packet, and then the BR performs IPv6 tunnel encapsulation on the downlink data packet that has undergone the NAT translation, and sends the downlink data packet to the server. Therefore, step 203 of providing, by the server, based on the service type of the data packet, a virtual residential gateway service for a user terminal connected to the RGW may specifically include the following steps:

A12. performing, by the server, IPv6 tunnel decapsulation on the downlink data packet; and A13. sending, by the server, the downlink data packet that has undergone the IPv6 tunnel decapsulation to the RGW.

A difference between the DS-Lite scenario and the MAP-E scenario lies in that, for a downlink data packet, the BR performs the IPv6 tunnel encapsulation after performing the NAT in the DS-Lite scenario; therefore, after receiving the downlink data packet from the BR, the server needs to perform IPv6 tunnel decapsulation first, and then forwards the downlink data packet to the RGW.

In a NAT64 application scenario, when the data packet is an uplink data packet, and a source IP address of the uplink data packet is an IPv6 address and a source port number of the uplink data packet is a port number of the user terminal, step A6 of performing, by the server, NAT on a source IP address and a source port number of the data packet includes:

translating the IPv6 address into a public network IPv4 address according to a flow table, and translating the port number of the user terminal into a public network port number according to the flow table.

When the data packet is a downlink data packet, and a source IP address of the downlink data packet is a public network IPv4 address and a source port number of the downlink data packet is a public network port number, step A6 of performing, by the server, NAT on a source IP address and a source port number of the data packet includes:

translating the public network IPv4 address into an IPv6 address according to a flow table, and translating the public network port number into a port number of the user terminal according to the flow table.

In the NAT64 application scenario, an IP address allocated by the server to the user terminal is an IPv6 address, and therefore the server needs to translate a source IP address (IPv6 address) into a public network IPv4 address, or translate a source IP address (public network IPv4 address) into an IPv6 address.

It can be seen from the foregoing embodiment that, if an RGW receives a data packet, the RGW forwards the data packet to a server, to perform identification, and after identifying a service type of the data packet, the server provides, based on the service type of the data packet, a virtual residential gateway service for a user terminal connected to the RGW; or if a network side receives a data packet, the network side forwards the data packet to a server, to perform identification, and after identifying a service type of the data packet, the server provides, based on the service type of the data packet, a virtual residential gateway service for a user terminal connected to an RGW. Because the RGW forwards the data packet to the server, and the virtual residential gateway service is provided by the server, it can be seen that a residential gateway service function of the RGW is shifted to the server; moreover, for the data packet sent by the network side, the server also provides, based on the service type of the data packet, the virtual residential gateway service for the user terminal, and the residential gateway service function is no longer provided by the RGW. Therefore, after the residential gateway service function of the RGW is shifted to the server, functions of the RGW are simplified, so that a home network is transparent during deployment and evolution of the IPv6 and is unaware of the deployment and evolution of the IPv6. Because the server is usually deployed at a network aggregation layer and has a more convenient maintenance mechanism, maintenance and upgrade costs can be reduced and a fault rate of a household device is also reduced.

For better understanding and implementing the foregoing solutions in the embodiment of the application, corresponding application scenarios are used as examples in the following for specific descriptions.

A detailed description is provided below by using an example in which a server described in this embodiment of the application is a BRAS, an RGW described in this embodiment of the application specifically refers to a routing RGW, and a future network mainly uses the routing RGW. In this embodiment of the application, the routing RGW only includes an interface function and some management functions (DLNA and TR-69), where the interface function, DLNA, and TR-69 are basic functions of the RGW.

In this embodiment of the application, Layer 3 and higher-layer functions of the RGW are shifted up to the BRAS, and the BRAS may implement the following functions:

1. Simplify a user access process: functions such as user authentication and DHCP address allocation are integrated into the BRAS.

2. Solve a NAT traversal issue: NAT performed by the RGW and NAT performed by the CGN are combined, thereby reducing a quantity of times of NAT that is performed on user traffic, and supporting opening of a port by means of uPnP (Universal Plug and Play, universal plug and play).

3. Centralized RGW management: only the BRAS needs to be upgraded and maintained, thereby greatly improving upgrade efficiency and maintenance efficiency of RGWs.

In future IPv6 evolution, different IPv6 schemes have different requirements on the RGW, while a feature of massive deployment of RGWs determines that an operator cannot upgrade or replace RGWs easily. In this embodiment of the application, main functions (such as network layer and higher-layer functions) of the RGW are integrated to the BRAS, which implements centralized management, and solves a problem that upgrade and maintenance of RGW are difficult, thereby providing powerful support for network evolution toward the IPv6, and desirably supporting various IPv6 transition technologies.

A description is provided below by using examples and with reference to the IPv6 transition technologies:

Referring to FIG. 3-a, FIG. 3-a is a schematic diagram of an implementation process when a method for implementing a residential gateway service function is applied to a NAT444 scenario according to an embodiment of the application. An RGW is connected to a user terminal (that is, a PC, Personal Computer), and the RGW is connected to a BRAS, where the BRAS can implement network layer and higher-layer functions of a routing RGW in the prior art, including user management, NAT, and the like. The BRAS may specifically include a BAS (Broadband Remote Access Server, broadband remote access server) board, a vHome (virtual residential gateway service) board, a network board, and an upstream board, where the BAS board is mainly configured to perform user management and user online information maintenance;

the vHome board, also used as a CGN board, is mainly configured to perform NAT on private network IPv4 traffic of a user to translate the traffic into public network IPv4 traffic;

the upstream board is an interface board, and is mainly configured to be connected to an upper-layer device, and receive and send data; and the network board is mainly configured to perform data exchange between different boards (such as the BAS board, the vHome board, and the upstream board), which equivalently implements functions of a bus.

It should be noted that, in this embodiment of the application, the BRAS allocates one public network IPv4 address and a series of continuous ports to each user terminal, so that a user uses the address and the ports during Internet access. The RGW mainly implements functions of a bridging RGW, where the bridging RGW refers to an RGW working at Layer 2, has simple functions, and does not have a routing function, and the user terminal is required to dial up, while the routing RGW refers to an RGW working at Layer 3 and can directly dial up, and multiple user terminals may be connected to the RGW.

Referring to FIG. 3-b, FIG. 3-b is a schematic diagram of an implementation process when a method for implementing a residential gateway service function is applied to an MAP-E scenario according to an embodiment of the application. An RGW is connected to a user terminal (that is, a PC), and the RGW is connected to a BRAS, where the BRAS is connected to a BR, and the BRAS can implement network layer and higher-layer functions of a routing RGW in the prior art, including user management, NAT, and the like. The BRAS may specifically include a BAS board, a vHome board, a network board, and an upstream board, where the BAS board is mainly configured to perform user management and user online information maintenance;

the vHome board is mainly configured to perform NAT on private network IPv4 traffic of a user to translate the traffic into public network IPv4 traffic, then encapsulate the public network IPv4 traffic into an IPv6 tunnel, and transparently transmit the public network IPv4 traffic to a BR, to perform processing;

the upstream board is an interface board, and is mainly configured to be connected to an upper-layer device, and receive and send data; and the network board is mainly configured to perform data exchange between different boards (such as the BAS board, the vHome board, and the upstream board), which equivalently implements functions of a bus.

It should be noted that, in this embodiment of the application, the BR implements IPv6 tunnel encapsulation/decapsulation of a packet and port-based packet forwarding, and is connected to the BRAS through an IPv6 tunnel; the BR allocates one public network IPv4 address and a series of continuous ports to each user terminal, so that a user uses the address and the ports during Internet access. The RGW mainly implements functions of a bridging RGW, including an interface function, DLNA, TR-69, and other management functions.

Referring to FIG. 3-c, FIG. 3-c is a schematic diagram of an implementation process when a method for implementing a residential gateway service function is applied to a DS-Lite scenario according to an embodiment of the application. An RGW is connected to a user terminal (that is, a PC), and the RGW is connected to a BRAS, where the BRAS is connected to a BR, and the BRAS can implement network layer and higher-layer functions of a routing RGW in the prior art, including user management, and the like. The BRAS may specifically include a BAS board, a vHome board, a network board, and an upstream board, where the BAS board is mainly configured to perform user management and user online information maintenance;

the vHome board is mainly configured to encapsulate private network IPv4 traffic of a user into an IPv6 tunnel, transparently transmit the private network IPv4 traffic to a BR, to perform processing; and the BR is responsible for performing NAT on the private network IPv4 traffic of the user to translate the private network IPv4 traffic into public network IPv4 traffic;

the upstream board is an interface board, and is mainly configured to be connected to an upper-layer device, and receive and send data; and the network board is mainly configured to perform data exchange between different boards (such as the BAS board, the vHome board, and the upstream board), which equivalently implements functions of a bus.

It should be noted that, in this embodiment of the application, the BR implements IPv6 tunnel encapsulation/decapsulation of a packet, NAT translation, and port-based packet forwarding, and is connected to the BRAS through an IPv6 tunnel; the BR allocates one public network IPv4 address and a series of continuous ports to each user terminal, so that a user uses the address and the ports during Internet access. The RGW mainly implements functions of a bridging RGW, including an interface function, DLNA, TR-69, and other management functions.

Referring to FIG. 3-d, FIG. 3-d is a schematic diagram of an implementation process when a method for implementing a residential gateway service function is applied to a NAT64 scenario according to an embodiment of the application. An RGW is connected to a user terminal (that is, a PC), and the RGW is connected to a BRAS, where the BRAS can implement network layer and higher-layer functions of a routing RGW, including user management, NAT, and the like. The BRAS may specifically include a BAS board, a vHome board, a network board, and an upstream board, where the BAS board is mainly configured to perform user management and user online information maintenance;

the vHome board, also used as a CGN board, is mainly configured to perform NAT on IPv6 traffic of a user to translate the traffic into public network IPv4 traffic;

the upstream board is an interface board, and is mainly configured to be connected to an upper-layer device, and receive and send data; and the network board is mainly configured to perform data exchange between different boards (such as the BAS board, the vHome board, and the upstream board), which equivalently implements functions of a bus.

It should be noted that, in this embodiment of the application, the BRAS allocates one public network IPv4 address and a series of continuous ports to each user terminal, so that a user uses the address and the ports during Internet access. The RGW mainly implements functions of a bridging RGW, including an interface function, DLNA, TR-69, and other management functions.

It can be learned from the foregoing description provided by using examples, the embodiments of the application solve the following problems: first, when deployment/evolution of the IPv6 requires RGW replacement and reconstruction of a peripheral system, in the embodiments of the application, a vHome board can simplify functions of an RGW, and make a home network transparent during deployment and evolution of the IPv6 and unaware of the deployment and evolution of the IPv6, thereby avoiding function complexity of the RGW caused by introduction of the IPv6; second, for impact on an application from two-level NAT traversal, in the embodiments of the application, combination of the RGW and a CGN is performed by using a vHome scheme, so that a user performs NAT only once when accessing a network, and the user may open a port in the vHome by means of uPnP, thereby satisfying a port opening requirement of the application; and finally, for high operation and maintenance costs of the RGW, the embodiments of the application can simplify the RGW and the home network, reduce network faults, simplify fault location, improve user experience, reduce construction of service centers, on-site repair, and RGW replacement, and decrease OPEX (Operating Expense, operating expense).

It should be noted that, for ease of description, the foregoing method embodiments are described as combinations of a series of actions, but a person skilled in the art should know that the application is not limited by the described action sequence, because in accordance with the application, some steps can be performed in other sequences or simultaneously. Besides, a person skilled in the art should also know that, all the embodiments described in the specification are exemplary embodiments, and the related actions and modules are not mandatory to the application.

For better implementing the foregoing solutions in the embodiments of the application, a related apparatus for implementing the foregoing solutions is further provided below.

Referring to FIG. 4-a, an embodiment of the application provides a server 400, which may include a receiving module 401, a service type acquiring module 402, and a virtual residential gateway service module 403, where the receiving module 401 is configured to receive a data packet forwarded by a residential gateway RGW or a network side;

the service type acquiring module 402 is configured to identify a service type of the data packet according to information carried in the data packet; and the virtual residential gateway service module 403 is configured to provide, based on the service type of the data packet, a virtual residential gateway service for a user terminal connected to the RGW.

In some embodiments of the application, the receiving module 401 is specifically configured to receive an uplink data packet forwarded by the RGW, where the uplink data packet is sent by the user terminal to the RGW; or receive a downlink data packet sent by the network side.

In some other embodiments of the application, when the data packet is an uplink data packet, the virtual residential gateway service module 403 is specifically configured to: if a service type of the uplink data packet is Dynamic Host Configuration Protocol DHCP request, allocate a private network Internet Protocol version 4 IPv4 address or an Internet Protocol next generation IPv6 address to the user terminal; or if a service type of the uplink data packet is dial-up Internet access request, perform user access authentication on the user terminal; or if a service type of the uplink data packet is sending uplink data to the network side, analyze the uplink data packet according to a function of a home firewall, to determine whether to allow the uplink data packet to pass, and if it is determined to allow the uplink data packet to pass, send the uplink data packet to the network side.

In some other embodiments of the application, when the data packet is a downlink data packet, the virtual residential gateway service module 403 is specifically configured to: if a service type of the downlink data packet is sending downlink data to the user terminal, analyze the downlink data packet according to a function of a home firewall, to determine whether to allow the downlink data packet to pass, and if it is determined to allow the downlink data packet to pass, send the downlink data packet to the RGW; or if a service type of the downlink data packet is sending downlink data to the user terminal, perform antivirus scanning on the downlink data packet, and send the downlink data packet that has undergone the antivirus scanning to the RGW.

In some other embodiments of the application, the virtual residential gateway service module 403 is specifically configured to perform user management and user online information maintenance on the user terminal after the user terminal goes online.

In some other embodiments of the application, if the service type of the data packet is sending uplink/downlink data, the virtual residential gateway service module 403 includes a NAT translation submodule 4031, configured to perform network address translation NAT on a source IP address and a source port number of the data packet.

Specifically, referring to FIG. 4-b, in some embodiments of the application, the NAT translation submodule 4031 includes: a determining subunit 40311, a first NAT translation subunit 40312, a NAT entry generating subunit 40313, and a second NAT translation subunit 40314, where the determining subunit 40311 is configured to determine whether the data packet matches an existing flow table; if the data packet matches the flow table, trigger the first NAT translation subunit 40312; or if the data packet does not match the flow table, trigger the NAT entry generating subunit 40313 and the second NAT translation subunit 40314;

the first NAT translation subunit 40312 is configured to: if the data packet matches the flow table, translate the source IP address and the source port number according to a NAT entry recorded in the flow table;

the NAT entry generating subunit 40313 is configured to: if the data packet does not match the flow table, generate a NAT entry according to a mapping relationship between the source IP address of the data packet, and an IP and a port that are predetermined in the server; and the second NAT translation subunit 40314 is configured to update the generated NAT entry to the flow table, and translate the source IP address and the source port number according to the NAT entry recorded in an updated flow table.

Referring to FIG. 4-c, in some embodiments of the application, if the data packet is an uplink data packet, the virtual residential gateway service module 403 may further include a first encapsulating submodule 4032 and a first sending submodule 4033 in addition to the NAT translation submodule 4031, where the first encapsulating submodule 4032 is configured to: after the NAT translation submodule 4031 performs NAT translation on the uplink data packet, perform IPv6 tunnel encapsulation on the uplink data packet that has undergone the NAT translation; and the first sending submodule 4033 is configured to send the uplink data packet that has undergone the IPv6 tunnel encapsulation to a border router BR, so that the BR decapsulates the uplink data packet that has undergone the IPv6 tunnel encapsulation, and then sends the uplink data packet to the network side.

Referring to FIG. 4-d, in some embodiments of the application, if the server receives a downlink data packet from a BR, the virtual residential gateway service module 403 may further include a first decapsulating submodule 4034 and a second sending submodule 4035 in addition to the NAT translation submodule 4031, where the first decapsulating submodule 4034 is configured to: before the NAT translation submodule 4031 performs NAT translation on the downlink data packet, perform IPv6 tunnel decapsulation on the downlink data packet;

the NAT translation submodule 4031 is specifically configured to perform NAT on a source IP address and a source port number of the downlink data packet that has undergone the IPv6 tunnel decapsulation; and the second sending submodule 4035 is configured to send the downlink data packet that has undergone the NAT translation to the RGW.

Referring to FIG. 4-e, in some embodiments of the application, if the data packet is an uplink data packet, the virtual residential gateway service module 403 may include a second encapsulating submodule 4036 and a first sending submodule 4033, where the second encapsulating submodule 4036 is configured to perform IPv6 tunnel encapsulation on the uplink data packet; and the first sending submodule 4033 is configured to send the uplink data packet that has undergone the IPv6 tunnel encapsulation to a BR, so that the BR performs IPv6 tunnel decapsulation on the uplink data packet that has undergone the IPv6 tunnel encapsulation and performs NAT on the uplink data packet, and then sends the uplink data packet to the network side.

Referring to FIG. 4-f, in some embodiments of the application, if the server receives a downlink data packet from a BR, the virtual residential gateway service module 403 includes a second decapsulating submodule 4037 and a second sending submodule 4035, where the second decapsulating submodule 4037 is configured to perform IPv6 tunnel decapsulation on the downlink data packet; and the second sending submodule 4035 is configured to send the downlink data packet that has undergone the IPv6 tunnel decapsulation to the RGW.

In some other embodiments of the application, if the data packet is an uplink data packet, and a source IP address of the uplink data packet is an IPv6 address and a source port number of the uplink data packet is a port number of the user terminal, the NAT translation submodule 4031 is specifically configured to translate the IPv6 address into a public network IPv4 address according to a flow table, and translate the port number of the user terminal into a public network port number according to the flow table; or if the data packet is a downlink data packet, and a source IP address of the downlink data packet is a public network IPv4 address and a source port number of the downlink data packet is a public network port number, the NAT translation submodule 4031 is specifically configured to translate the public network IPv4 address into an IPv6 address according to a flow table, and translate the public network port number into a port number of the user terminal according to the flow table.

It should be noted that, content such as information exchange among modules/units of the apparatus and the execution processes achieves the same technical effects as the method embodiments of the application because the content is based on the same concept as the method embodiments of the application. For specific content, reference may be made to the description in the method embodiments described above, which is not described herein again.

It can be seen from the foregoing embodiments shown in FIG. 4-a to FIG. 4-f that, if an RGW receives a data packet, the RGW forwards the data packet to a server, to perform identification, and after identifying a service type of the data packet, the server provides, based on the service type of the data packet, a virtual residential gateway service for a user terminal connected to the RGW; or if a network side receives a data packet, the network side forwards the data packet to a server, to perform identification, and after identifying a service type of the data packet, the server provides, based on the service type of the data packet, a virtual residential gateway service for a user terminal connected to an RGW. Because the RGW forwards the data packet to the server, and the virtual residential gateway service is provided by the server, it can be seen that a residential gateway service function of the RGW is shifted to the server; moreover, for the data packet sent by the network side, the server also provides, based on the service type of the data packet, the virtual residential gateway service for the user terminal, and the residential gateway service function is no longer provided by the RGW. Therefore, after the residential gateway service function of the RGW is shifted to the server, functions of the RGW are simplified, so that a home network is transparent during deployment and evolution of the IPv6 and is unaware of the deployment and evolution of the IPv6. Because the server is usually deployed at a network aggregation layer and has a more convenient maintenance mechanism, maintenance and upgrading costs can be reduced and a fault rate of a household device is also reduced.

An embodiment of the application further provides a computer storage medium, where the computer storage medium stores a program, and the program executes a part or all of deployment described in the foregoing method embodiments.

Another server provided by an embodiment of the application is described below. Referring to FIG. 5, a server 500 includes:

an input apparatus 501, an output apparatus 502, a processor 503, and a memory 504 (where there may be one or more processors 503 in the server 500, and one processor is used as an example in FIG. 5). In some embodiments of the application, the input apparatus 501, the output apparatus 502, the processor 503, and the memory 504 may be connected to each other by using a bus or in another manner, where an example in which a connection is implemented by using a bus is used in FIG. 5.

The processor 503 is configured to perform the following steps: receiving, by using the input apparatus 501, a data packet forwarded by a residential gateway RGW or a network side; identifying a service type of the data packet according to information carried in the data packet; and providing, based on the service type of the data packet, a virtual residential gateway service for a user terminal connected to the RGW.

In some embodiments of the application, the processor 503 is specifically configured to perform the following step: receiving, by using the input apparatus 501, an uplink data packet forwarded by the RGW, where the uplink data packet is sent by the user terminal to the RGW; or receiving, by using the input apparatus 501, a downlink data packet sent by the network side.

In some embodiments of the application, the processor 503 is specifically configured to perform the following step: when the data packet is an uplink data packet, if a service type of the uplink data packet is Dynamic Host Configuration Protocol DHCP request, allocating a private network Internet Protocol version 4 IPv4 address or an Internet Protocol next generation IPv6 address to the user terminal; or if a service type of the uplink data packet is dial-up Internet access request, performing user access authentication on the user terminal; or if a service type of the uplink data packet is sending uplink data to the network side, analyzing the uplink data packet according to a function of a home firewall, to determine whether to allow the uplink data packet to pass, and if it is determined to allow the uplink data packet to pass, sending the uplink data packet to the network side.

In some embodiments of the application, the processor 503 is specifically configured to perform the following step: when the data packet is a downlink data packet, if a service type of the downlink data packet is sending downlink data to the user terminal, analyzing the downlink data packet according to a function of a home firewall, to determine whether to allow the downlink data packet to pass, and if it is determined to allow the downlink data packet to pass, sending the downlink data packet to the RGW; or if a service type of the downlink data packet is sending downlink data to the user terminal, performing antivirus scanning on the downlink data packet, and send the downlink data packet that has undergone the antivirus scanning to the RGW.

In some embodiments of the application, the processor 503 is specifically configured to perform the following step: performing user management and user online information maintenance on the user terminal after the user terminal goes online.

In some embodiments of the application, the processor 503 is specifically configured to perform the following step: if the service type of the data packet is sending uplink/downlink data, performing network address translation NAT on a source IP address and a source port number of the data packet.

In some embodiments of the application, the processor 503 is specifically configured to perform the following steps: determining whether the data packet matches an existing flow table; if the data packet matches the flow table, translating the source IP address and the source port number according to a NAT entry recorded in the flow table; if the data packet does not match the flow table, generating a NAT entry according to a mapping relationship between the source IP address of the data packet, and an IP and a port that are predetermined in the server; and updating the generated NAT entry to the flow table, and translating the source IP address and the source port number according to the NAT entry recorded in an updated flow table.

In some embodiments of the application, the processor 503 is further configured to perform the following steps: after performing the network address translation NAT on the source IP address and the source port number of the data packet, performing IPv6 tunnel encapsulation on the uplink data packet that has undergone the NAT translation; and sending the uplink data packet that has undergone the IPv6 tunnel encapsulation to a border router BR, so that the BR decapsulates the uplink data packet that has undergone the IPv6 tunnel encapsulation and then sends the uplink data packet to the network side.

In some embodiments of the application, the processor 503 is specifically configured to perform the following steps: if the server receives a downlink data packet from a BR, before performing the network address translation NAT on the source IP address and the source port number of the data packet, performing IPv6 tunnel decapsulation on the downlink data packet; performing NAT on a source IP address and a source port number of the downlink data packet that has undergone the IPv6 tunnel decapsulation; and after performing the NAT on the source IP address and the source port number of the downlink data packet that has undergone the IPv6 tunnel decapsulation, sending the downlink data packet that has undergone the NAT translation to the RGW.

In some embodiments of the application, the processor 503 is specifically configured to perform the following steps: if the data packet is an uplink data packet, performing IPv6 tunnel encapsulation on the uplink data packet; and sending the uplink data packet that has undergone the IPv6 tunnel encapsulation to a BR, so that the BR performs IPv6 tunnel decapsulation on the uplink data packet that has undergone the IPv6 tunnel encapsulation and performs NAT on the uplink data packet, and then sends the uplink data packet to the network side.

In some embodiments of the application, the processor 503 is specifically configured to perform the following steps: if the server receives a downlink data packet from a BR, performing IPv6 tunnel decapsulation on the downlink data packet; and sending the downlink data packet that has undergone the IPv6 tunnel decapsulation to the RGW.

In some embodiments of the application, the processor 503 is specifically configured to perform the followings step: if the data packet is an uplink data packet and a source IP address of the uplink data packet is an IPv6 address and a source port number of the uplink data packet is a port number of the user terminal, translating the IPv6 address into a public network IPv4 address according to a flow table, and translating the port number of the user terminal into a public network port number according to the flow table; or if the data packet is a downlink data packet and a source IP address of the downlink data packet is a public network IPv4 address and a source port number of the downlink data packet is a public network port number, translating the public network IPv4 address into an IPv6 address according to a flow table, and translating the public network port number into a port number of the user terminal according to the flow table.

It can be seen from the foregoing embodiment that, if an RGW receives a data packet, the RGW forwards the data packet to a server, to perform identification, and after identifying a service type of the data packet, the server provides, based on the service type of the data packet, a virtual residential gateway service for a user terminal connected to the RGW; or if a network side receives a data packet, the network side forwards the data packet to a server, to perform identification, and after identifying a service type of the data packet, the server provides, based on the service type of the data packet, a virtual residential gateway service for a user terminal connected to an RGW. Because the RGW forwards the data packet to the server, and the virtual residential gateway service is provided by the server, it can be seen that a residential gateway service function of the RGW is shifted to the server; moreover, for the data packet sent by the network side, the server also provides, based on the service type of the data packet, the virtual residential gateway service for the user terminal, and the residential gateway service function is no longer provided by the RGW. Therefore, after the residential gateway service function of the RGW is shifted to the server, functions of the RGW are simplified, so that a home network is transparent during deployment and evolution of the IPv6 and is unaware of the deployment and evolution of the IPv6. Because the server is usually deployed at a network aggregation layer and has a more convenient maintenance mechanism, maintenance and upgrading costs can be reduced and a fault rate of a household device is also reduced.

A person of ordinary skill in the art may understand that all or some of the steps of the methods in the foregoing embodiments may be implemented by a program instructing relevant hardware. The program may be stored in a computer-readable storage medium. The storage medium may include: a read-only memory, a magnetic disk, or an optical disc.

A method for implementing a residential gateway service function and a server that are provided by the application are described in detail above. A person of ordinary skill in the art may make modifications to the specific implementation manners and the application scope according to the idea of the embodiments of the application. Therefore, the content of this specification shall not be construed as a limitation to the application.

What is claimed is:

1. A method for implementing a virtual residential gateway service function, the method comprising:
   receiving, by a server operating as a broadband remote access server (BRAS), a data packet forwarded by a residential gateway (RGW) or a network side, including receiving an uplink data packet forwarded by the RGW, wherein the uplink data packet is sent by a user terminal to the RGW, or receiving a downlink data packet sent by the network side;
   identifying, by the server, a service type of the data packet according to information carried in the data packet; and
   providing, by the server, based on the service type of the data packet, a virtual residential gateway service for the user terminal connected to the RGW, comprising performing, by the server, user management and user online information maintenance on the user terminal after the user terminal goes online,
   wherein, when the service type of the data packet is sending uplink/downlink data, providing the virtual residential gateway service includes
      performing, by the server, network address translation (NAT) on a source Internet Protocol (IP) address and a source port number of the data packet,
   and wherein, when the data packet is an uplink data packet, providing the virtual residential gateway service includes
      after the NAT performed on the source IP address and the source port number of the data packet, performing, by the server, IPv6 tunnel encapsulation on the uplink data packet that has undergone the NAT translation, and
      sending, by the server, the uplink data packet that has undergone the IPv6 tunnel encapsulation to a border router (BR),
      in response to determining that a service type of the uplink data packet is a Dynamic Host Configuration Protocol (DHCP) request, allocating, by the server, a private network Internet Protocol version 4 (IPv4) address or an Internet Protocol next generation (IPv6) address to the user terminal,
      in response to determining that a service type of the uplink data packet is a dial-up Internet access request, performing, by the server, user access authentication on the user terminal, and
      in response to determining that a service type of the uplink data packet is sending uplink data to the network side, analyzing, by the server, the uplink data packet according to a function of a home firewall to determine whether to allow the uplink data packet to pass, and if it is determined to allow the uplink data packet to pass, sending the uplink data packet to the network side.

2. The method according to claim 1, wherein when the data packet is a downlink data packet, providing, by the server, based on the service type of the data packet, the virtual residential gateway service for the user terminal connected to the RGW comprises:

if a service type of the downlink data packet is sending downlink data to the user terminal, analyzing, by the server, the downlink data packet according to a function of a home firewall, to determine whether to allow the downlink data packet to pass, and if it is determined to allow the downlink data packet to pass, sending the downlink data packet to the RGW; or if a service type of the downlink data packet is sending downlink data to the user terminal, performing, by the server, antivirus scanning on the downlink data packet, and sending the downlink data packet that has undergone the antivirus scanning to the RGW.

3. The method according to claim 1, wherein performing, by the server, network address translation (NAT) on the source IP address and the source port number of the data packet comprises:

determining whether the data packet matches an existing flow table;

if the data packet matches the flow table, translating the source IP address and the source port number according to a NAT entry recorded in the flow table;

if the data packet does not match the flow table, generating a NAT entry according to a mapping relationship between the source IP address of the data packet, and an IP and a port that are predetermined in the server; and updating the generated NAT entry to the flow table, and translating the source IP address and the source port number according to the NAT entry recorded in an updated flow table.

4. A server operating as a broadband remote access server (BRAS), comprising:

an input apparatus, an output apparatus and a memory; and a processor configured to:
receive, by using the input apparatus, a data packet forwarded by a residential gateway (RGW) or a network side, including receiving an uplink data packet forwarded by the RGW, wherein the uplink data packet is sent by a user terminal to the RGW, or receiving a downlink data packet sent by the network side, identify a service type of the data packet according to information carried in the data packet, and provide, based on the service type of the data packet, a virtual residential gateway service for the user terminal connected to the RGW, comprising performing user management and user online information maintenance on the user terminal after the user terminal goes online, wherein, when the service type of the data packet is sending uplink/downlink data, providing the virtual residential gateway service includes performing network address translation (NAT) on a source Internet Protocol (IP) address and a source port number of the data packet, and wherein, when the data packet is an uplink data packet, providing the virtual residential gateway service includes after the NAT performed on the source IP address and the source port number of the data packet, performing IPv6 tunnel encapsulation on the uplink data packet that has undergone the NAT translation, sending the uplink data packet that has undergone the IPv6 tunnel encapsulation to a border router (BR), in response to determining that a service type of the uplink data packet is a Dynamic Host Configuration Protocol (DHCP) request, allocating a private network Internet Protocol version 4 (IPv4) address or an Internet Protocol next generation (IPv6) address to the user terminal, in response to determining that a service type of the uplink data packet is a dial-up Internet access request, performing user access authentication on the user terminal, and in response to determining that a service type of the uplink data packet is sending uplink data to the network side, analyzing the uplink data packet according to a function of a home firewall to determine whether to allow the uplink data packet to pass, and if it is determined to allow the uplink data packet to pass, sending the uplink data packet to the network side.

5. The server according to claim 4, wherein when the data packet is a downlink data packet, the processor is configured to:

if a service type of the downlink data packet is sending downlink data to the user terminal, analyze the downlink data packet according to a function of a home firewall, to determine whether to allow the downlink data packet to pass, and if it is determined to allow the downlink data packet to pass, send the downlink data packet to the RGW; or if a service type of the downlink data packet is sending downlink data to the user terminal, perform antivirus scanning on the downlink data packet, and send the downlink data packet that has undergone the antivirus scanning to the RGW.

6. The server according to claim 4, wherein the processor is configured to:

determine whether the data packet matches an existing flow table;

if the data packet matches the flow table, translate the source IP address and the source port number according to a NAT entry recorded in the flow table;

if the data packet does not match the flow table, generate a NAT entry according to a mapping relationship between the source IP address of the data packet, and an IP and a port that are predetermined in the server; and update the generated NAT entry to the flow table, and translate the source IP address and the source port number according to the NAT entry recorded in an updated flow table.

7. The server according to claim 4, wherein the processor is specifically configured to:

if the server receives a downlink data packet from a border router (BR), before performing the network address translation (NAT) on the source IP address and the source port number of the data packet, performing IPv6 tunnel decapsulation on the downlink data packet;

perform NAT on a source IP address and a source port number of the downlink data packet that has undergone the IPv6 tunnel decapsulation; and after performing the NAT on the source IP address and the source port number of the downlink data packet that has undergone the IPv6 tunnel decapsulation, send the downlink data packet that has undergone the NAT translation to the RGW.

8. The server according to claim 4, wherein
the BR performs IPv6 tunnel decapsulation on the uplink data packet that has undergone the IPv6 tunnel encapsulation and performs NAT on the uplink data packet, and then sends the uplink data packet to the network side.

9. The server according to claim 4, wherein the processor is configured to:
if the server receives a downlink data packet from a border router (BR),
perform IPv6 tunnel decapsulation on the downlink data packet; and
send the downlink data packet that has undergone the IPv6 tunnel decapsulation to the RGW.

10. The server according to claim 4, wherein the processor is configured to:
if the data packet is an uplink data packet, and a source IP address of the uplink data packet is an IPv6 address and a source port number of the uplink data packet is a port number of the user terminal, translate the IPv6 address into a public network IPv4 address according to a flow table, and translate the port number of the user terminal into a public network port number according to the flow table; or
if the data packet is a downlink data packet, and a source IP address of the downlink data packet is a public network IPv4 address and a source port number of the downlink data packet is a public network port number, translate the public network IPv4 address into an IPv6 address according to a flow table, and translate the public network port number into a port number of the user terminal according to the flow table.

* * * * *